United States Patent
Kim et al.

(10) Patent No.: US 10,820,287 B2
(45) Date of Patent: Oct. 27, 2020

(54) SYNCHRONIZATION METHOD AND APPARATUS IN WIRELESS COMMUNICATION SYSTEM

(71) Applicant: Samsung Electronics Co., Ltd., Gyeonggi-do (KR)

(72) Inventors: Youngbum Kim, Gyeonggi-do (KR); Juho Lee, Gyeonggi-do (KR); Heedon Gha, Gyeonggi-do (KR); Taehyoung Kim, Gyeonggi-do (KR); Taehan Bae, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 102 days.

(21) Appl. No.: 16/378,005

(22) Filed: Apr. 8, 2019

(65) Prior Publication Data

US 2019/0313351 A1 Oct. 10, 2019

(30) Foreign Application Priority Data

Apr. 6, 2018 (KR) .......................... 10-2018-0040603

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0094* (2013.01); *H04W 72/0446* (2013.01);
(Continued)

(58) Field of Classification Search
CPC ........... H04W 56/001; H04W 72/0446; H04W 72/0453; H04W 88/06; H04W 88/10; H04L 5/0094; H04L 5/0005
See application file for complete search history.

(56) References Cited

U.S. PATENT DOCUMENTS

| 2017/0006578 A1 | 1/2017 | Rico Alvarino et al. |
| 2017/0311276 A1 | 10/2017 | Tsai et al. |

(Continued)

FOREIGN PATENT DOCUMENTS

| KR | 1020170093675 | 8/2017 |
| KR | 1020180025878 | 3/2018 |

(Continued)

OTHER PUBLICATIONS

International Search Report dated Jul. 19, 2019 issued in counterpart application No. PCT/KR2019/004080, 11 pages.

*Primary Examiner* — Melvin C Marcelo
(74) *Attorney, Agent, or Firm* — The Farrell Law Firm, P.C.

(57) ABSTRACT

A synchronization method of a user equipment (UE) and a base station (BS) in a wireless communication system, a UE and a BS for establishing synchronization in a wireless communication system, and a non-transitory computer-readable recording medium are provided. The synchronization method of a UE includes detecting a first synchronization signal from a signal received from a BS, detecting repeatedly receivable one or more synchronization signals after the first synchronization signal is detected, based on each of blocks corresponding to a preset synchronization signal mapping pattern on time-frequency resources, combining the one or more synchronization signals, and establishing synchronization with the BS based on a block corresponding to a highest strength of the combined one or more synchronization signals, among the blocks.

20 Claims, 15 Drawing Sheets

(51) Int. Cl.
  *H04W 72/04* (2009.01)
  *H04W 88/06* (2009.01)
  *H04W 88/10* (2009.01)

(52) U.S. Cl.
  CPC ....... *H04W 72/0453* (2013.01); *H04W 88/06* (2013.01); *H04W 88/10* (2013.01); *H04L 5/0005* (2013.01)

(56) References Cited

U.S. PATENT DOCUMENTS

2018/0084593 A1* 3/2018 Chen .................... H04L 5/0048
2020/0015180 A1* 1/2020 Islam ................ H04W 74/0833

FOREIGN PATENT DOCUMENTS

| KR | 10-2018-0049967 | 5/2018 |
| WO | WO 2017/045849 | 3/2017 |

* cited by examiner

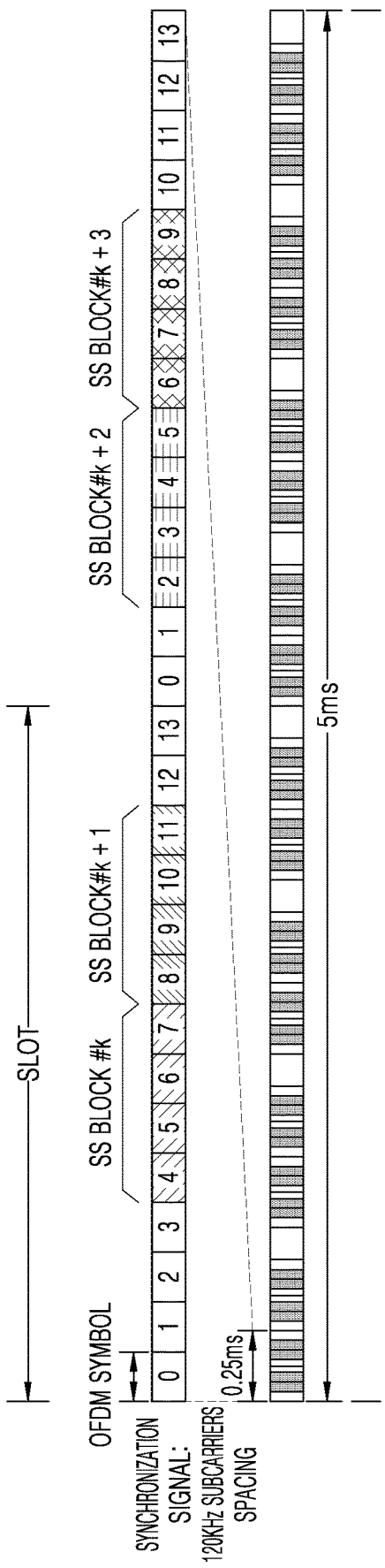
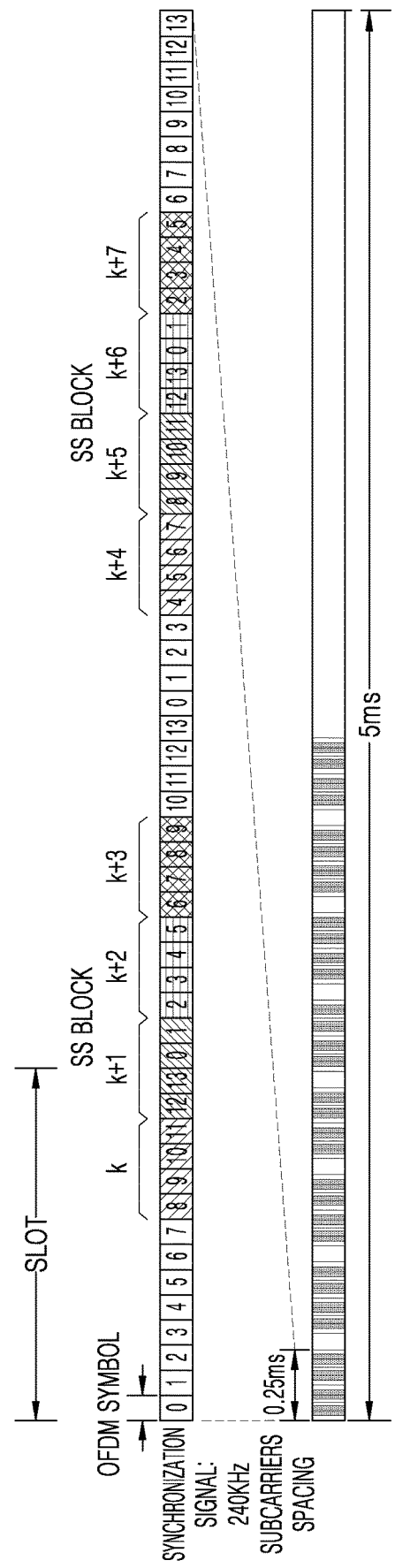

SYNCHRONIZATION METHOD AND APPARATUS IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0040603, filed on Apr. 6, 2018, in the Korean Intellectual Property Office, the disclosure of which is incorporated by reference herein in its entirety.

BACKGROUND

1. Field

The disclosure relates to wireless communication systems, and more particularly, to methods and apparatuses for synchronization between a user equipment (UE) and a base station (BS).

2. Description of Related Art

In order to meet increasing demands with respect to wireless data traffic after the commercialization of fourth generation (4G) communication systems, considerable efforts have been made to develop pre-fifth generation (pre-5G) communication systems or advanced 5G communication systems. For this reason, 5G communication systems or pre-5G communication systems are called beyond 4G network communication systems, post long term evolution (LTE) systems, or next-generation mobile communication systems. In order to achieve high data rates, implementation of 5G communication systems in an ultra-high frequency or millimeter-wave (mmWave) band (e.g., a 60-GHz band) is considered. In order to reduce path loss and increase a transmission distance in the ultra-high frequency band for 5G communication systems, various technologies such as beamforming, massive multiple input multiple output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RANs), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency shift keying (FSK) and quadrature amplitude modulation (QAM) (FQAM) and sliding window superposition coding (SWSC) and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology, in which the IoT technology is combined with, for example, technology for processing big data through a connection with a cloud server, is being newly provided. In order to implement the IoT, various technological elements such as a sensing technology, wired/wireless communication and network infrastructures, a service interface technology, and a security technology are required. In recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects and thus to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using 5G communication technology including beamforming, MIMO, array antennas, etc. Application of a cloud RAN as the above-described big data processing technology may be an example of convergence of the 5G communication technology and the IoT technology.

Because various services may be provided due to the development of wireless communication systems, methods capable of appropriately providing these services are required.

SUMMARY

An aspect of the disclosure provides methods for efficient synchronization between a UE and a BS in wireless communication systems.

According to an aspect of the disclosure, a synchronization method of a UE in a wireless communication system is provided. The method includes detecting a first synchronization signal from a signal received from a BS, detecting repeatedly receivable one or more synchronization signals after the first synchronization signal is detected, based on each of blocks corresponding to a preset synchronization signal mapping pattern on time-frequency resources, combining the one or more synchronization signals, and establishing synchronization with the BS based on a block corresponding to a highest strength of the combined one or more synchronization signals, among the blocks.

According to another aspect of the disclosure, a synchronization method of a BS in a wireless communication system is provided. The method includes repeatedly transmitting synchronization signals at blocks corresponding to a preset synchronization signal mapping pattern on time-frequency resources, and allocating uplink resources based on a request of at least one UE when synchronization is established between the at least one UE and the BS based on the transmitted synchronization signals, wherein one or more synchronization signals detected by the at least one UE based on each of the blocks corresponding to the synchronization signal mapping pattern are combined and synchronization is established between the at least one UE and the BS based on a block corresponding to a highest strength of the combined one or more synchronization signals.

According to another aspect of the disclosure, a UE for establishing synchronization in a wireless communication system is provided. The UE includes a transceiver configured to receive a signal from a BS, at least one processor configured to detect a first synchronization signal from the received signal, detect repeatedly receivable one or more synchronization signals after the first synchronization signal is detected, based on each of blocks corresponding to a preset synchronization signal mapping pattern on time-frequency resources, combine the one or more synchronization signals, and establish synchronization with the BS based on a block corresponding to a highest strength of the combined one or more synchronization signals, among the blocks, and a memory configured to store the preset synchronization signal mapping pattern.

According to another aspect of the disclosure, a BS for establishing synchronization in a wireless communication system is provided. The BS includes a transceiver configured to repeatedly transmit synchronization signals at blocks corresponding to a preset synchronization signal mapping pattern on time-frequency resources, at least one processor configured to allocate uplink resources based on a request of at least one UE when synchronization is established between the at least one UE and the BS based on the transmitted synchronization signals, and a memory configured to store the preset synchronization signal mapping pattern, wherein one or more synchronization signals detected by the at least one UE based on each of the blocks corresponding to the synchronization signal mapping pattern are combined and synchronization is established between the at least one UE and the BS based on a block corresponding to a highest strength of the combined one or more synchronization signals.

According to another aspect of the disclosure, a non-transitory computer-readable recording medium is provided. The non-transitory computer-readable recording medium includes a computer program recorded thereon for executing the method of a UE in a wireless communication system described above.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is an illustration of a mapping pattern of SS blocks in a case when a subcarrier spacing of a synchronization signal is 120 kHz, according to an embodiment;

FIG. 10 is an illustration of a mapping pattern of SS blocks in a case when a subcarrier spacing of a synchronization signal is 240 kHz, according to an embodiment;

DETAILED DESCRIPTION

Figure 1:
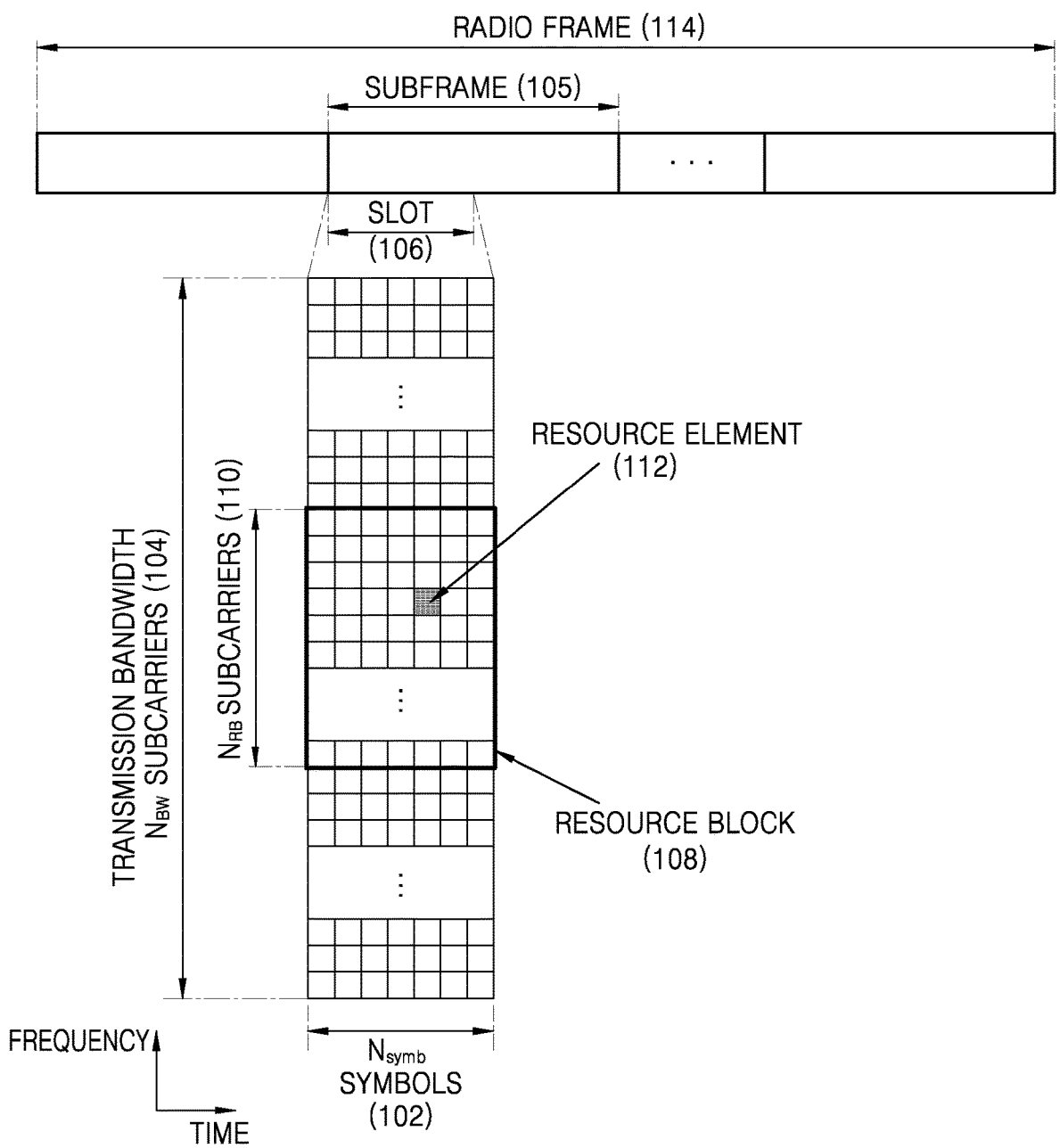
FIG. 1 is an illustration of a basic structure of a time-frequency resource region corresponding to a radio resource region for data or control channel transmission of LTE and LTE-advanced (LTE-A) systems.

While describing embodiments of the disclosure, technical content that is well-known in the related fields and not directly related to the disclosure is not provided. By omitting redundant descriptions, the essence of the disclosure is not obscured and is clearly explained.

For the same reasons, components may be exaggerated, omitted, or schematically illustrated in the accompanying drawings for clarity. In addition, the size of each component does not completely reflect the actual size. In the accompanying drawings, like reference numerals denote like elements.

One or more embodiments of the disclosure and methods of accomplishing the same may be understood more readily by reference to the following detailed description and the accompanying drawings. In this regard, the present disclosure may have different forms and is not intended to be limited to the descriptions set forth herein. Rather, these embodiments of the disclosure are provided so that the disclosure is thorough and complete and fully conveys the present disclosure to one of ordinary skill in the art, where the disclosure is defined by the appended claims and their equivalents.

It should be understood that combinations of blocks in flowcharts or process flow diagrams may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a non-transitory computer-usable or computer-readable memory capable of directing a computer or another programmable data processing apparatus to implement a function in a particular manner, and thus the instructions stored in the non-transitory computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the disclosure indicates a software component or hardware component such as a field programmable gate array (FPGA) or an application specific integrated circuit (ASIC), and performs a specific function. However, the term "unit" is not intended to be limited to software or hardware. The term "unit" may be a function formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and units may be associated with a smaller number of components and units, or may be divided into additional components and units. Furthermore, the components and units may be embodied to reproduce one or more central processing units (CPUs) in a device or security multimedia card. In addition, in the disclosure, the term "unit" may indicate a component that includes at least one processor.

Throughout the disclosure, the expression "at least one of a, b or c" indicates only a, only b, only c, both a and b, both a and c, both b and c, all of a, b, and c, and variations thereof.

Recently, in order to handle explosively increasing mobile data traffic, there has been a lively discussion on 5G or new radio access technology (NR) systems, which are next-generation communication systems after LTE or evolved universal terrestrial radio access (E-UTRA) systems and LTE-A or E-UTRA evolution systems. As compared with legacy mobile communication systems focused on typical voice/data communication, the 5G systems are aimed at providing and meeting requirements for various services such as enhanced mobile broadband (eMBB) services for improving the existing voice/data communication, ultra-reliable and low latency communication (URLLC) services, and massive machine-type communication (MTC) services for supporting massive machine type communication.

A system transmission bandwidth for a single carrier in the legacy LTE and LTE-A systems is limited to up to 20 MHz, whereas the 5G systems are mainly aimed at providing ultra-high-speed data services of up to several Gbps by using an ultra-wideband remarkably greater than the system transmission bandwidth of the legacy LTE and LTE-A systems. As such, an ultra-high frequency band from several GHz to 100 GHz is considered as a candidate frequency band for the 5G systems to easily ensure an ultra-wideband frequency. Additionally, ensuring a wideband frequency for the 5G systems through frequency reallocation or allocation based on a frequency band included in a range from several hundred MHz to several GHz used by legacy mobile communication systems is also considered.

An ultra-high frequency band has a wavelength of several millimeters (mm) and may also be called an mmWave band. However, in the ultra-high frequency band, path loss increases in proportion to the frequency band and thus coverage of a mobile communication system decreases.

In order to cope with the decrease in the coverage in the ultra-high frequency band, beamforming has attracted people's attention as a technology for increasing a transmission distance by concentrating radiation energy of radio waves on a certain target point by using a plurality of antennas. That is, a beam width of a signal using the beamforming technology is narrowed and radiation energy is concentrated within the narrowed beam width, thereby increasing a transmission distance. The beamforming technology is applicable not only to a transmitter but also to a receiver. In addition to the coverage increasing effect, the beamforming technology also has an effect of reducing interference in regions other than a beamforming direction. For proper implementation of the beamforming technology, an accurate transmission/reception beam measurement and feedback method is required. The beamforming technology is applicable to control or data channels having 1-to-1 correspondence between a certain UE and a BS. The beamforming technology is also applicable to control and data channels for transmitting common signals, e.g., a synchronization signal, a physical broadcast channel (PBCH) signal, and system information, from the BS to a plurality of UEs in a system, to increase coverage. When the beamforming technology is applied to the common signal, a beam sweeping technology for transmitting a signal by changing a beam direction may be additionally applied to allow the common signals to reach a UE positioned at an arbitrary location within a cell.

As another requirement for the 5G systems, ultra-low latency services having a transmission delay of about 1 ms between the transmitter and the receiver is required. In order to reduce the transmission delay, for example, a frame structure based on a short transmit time interval (TTI) as compared to that of the LTE and LTE-A systems must be designed. The TTI is a basic time unit for scheduling and the legacy LTE and LTE-A systems have a TTI of 1 ms corresponding to the length of one subframe. For example, the short TTI capable of meeting the requirement for ultra-low latency services in the 5G systems may include 0.5 ms, 0.2 ms, and 0.1 ms which are shorter than that of the legacy LTE and LTE-A systems. Hereinafter, a frame structure of LTE and LTE-A systems and a direction of designing 5G systems is described with reference to the accompanying drawings.

FIG. 1 is an illustration of a basic structure of a time-frequency resource region corresponding to a radio resource region for data or control channel transmission of LTE and LTE-A systems.

Referring to FIG. 1, a horizontal axis indicates a time domain and a vertical axis indicates a frequency domain. An uplink (UL) refers to a radio link for transmitting a data or control signal from a UE to a BS, and a downlink (DL) refers to a radio link for transmitting a data or control signal from the BS to the UE. The smallest transmission unit of the legacy LTE and LTE-A systems in the time domain is an orthogonal frequency division multiplexing (OFDM) symbol for DL and is a single carrier-frequency division multiple access (SC-FDMA) symbol for UL. $N_{symb}$ symbols 102 configure one slot 106, and two slots configure one subframe 105. The slot 106 has a length of 0.5 ms and the subframe 105 has a length of 1.0 ms. A radio frame 114 is a time-domain unit including 10 subframes. The smallest transmission unit in the frequency domain is a 15 kHz-unit subcarrier (subcarrier spacing=15 kHz), and a total system transmission bandwidth may include a total of $N_{BW}$ subcarriers 104.

A basic resource unit in the time-frequency resource region is a resource element (RE) 112 which may be indicated by an OFDM or SC-FDMA symbol index and a subcarrier index. A resource block (RB) (or physical resource block (PRB)) 108 may be defined as $N_{symb}$ consecutive OFDM or SC-FDMA symbols in the time domain and $N_{RB}$ consecutive subcarriers 110 in the frequency domain. Therefore, one RB 108 may include $N_{symb} \times N_{RB}$ REs 112. In the LTE and LTE-A systems, data is mapped in units of an RB and the BS performs scheduling for a certain UE in units of an RB pair configuring one subframe. The number $N_{symb}$ of SC-FDMA or OFDM symbols is determined based on the length of a cyclic prefix (CP) added per symbol to prevent intersymbol interference. For example, $N_{symb}=7$ when a normal CP is applied, and $N_{symb}=6$ when an extended CP is applied. Compared to the normal CP, the extended CP is applied to a system having a large transmission distance and thus orthogonality between symbols may be maintained.

A subcarrier spacing, a CP length, etc. are information required for OFDM transception and must be shared as common values between the BS and the UE for appropriate transception.

$N_{BW}$ and $N_{RB}$ are proportional to the system transmission bandwidth. A data rate may increase in proportion to the number of RBs scheduled for the UE.

The above-described frame structure of the LTE and LTE-A systems is designed in consideration of general voice/data communications and is limited in scalability to satisfy various services and requirements for a 5G system. Therefore, the 5G system must flexibly define and utilize the frame structure in consideration of various services and requirements.

Figure 2:
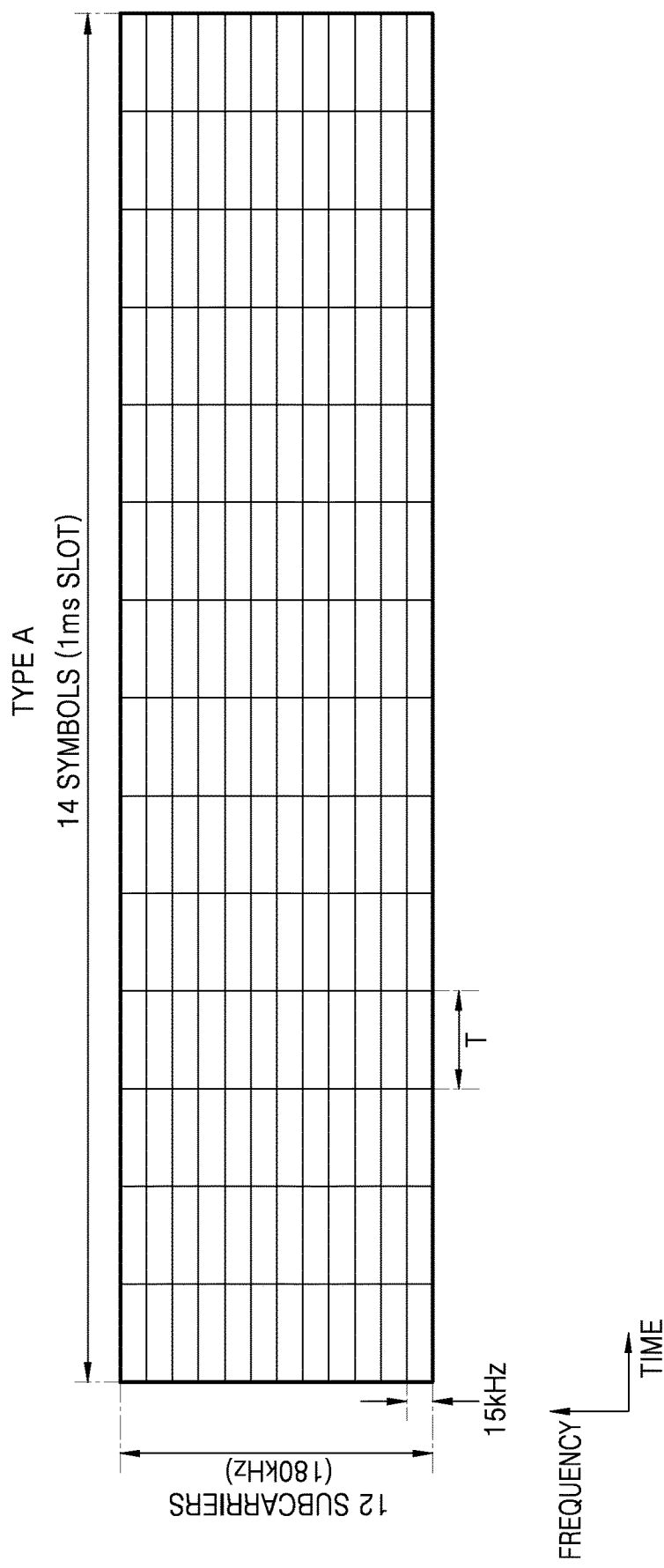
FIG. 2 is an illustration of an extended frame structure according to an embodiment.

FIG. 2 is an illustration of an extended frame structure according to an embodiment.

Referring to FIG. 2, an essential parameter set for defining the extended frame structure may include a subcarrier spacing, a CP length, a slot length, etc. In a 5G system, a basic time unit for scheduling is called a slot.

At an early stage of future adoption of the 5G system, at least coexistence or dual mode operation with a legacy LTE/LTE-A system is expected. As such, the legacy LTE/LTE-A system may provide stable system operation, and the 5G system may provide enhanced services. Therefore, the extended frame structure of the 5G system must include at least a frame structure or essential parameter set of the LTE/LTE-A system. FIG. 2 illustrates the 5G frame structure or essential parameter set equal to the frame structure of LTE/LTE-A. In a frame structure type A, a subcarrier spacing may be 15 kHz, 14 symbols may configure a 1-ms slot, and 12 subcarriers (=180 kHz=12×15 kHz) may configure a PRB.

Figure 3:
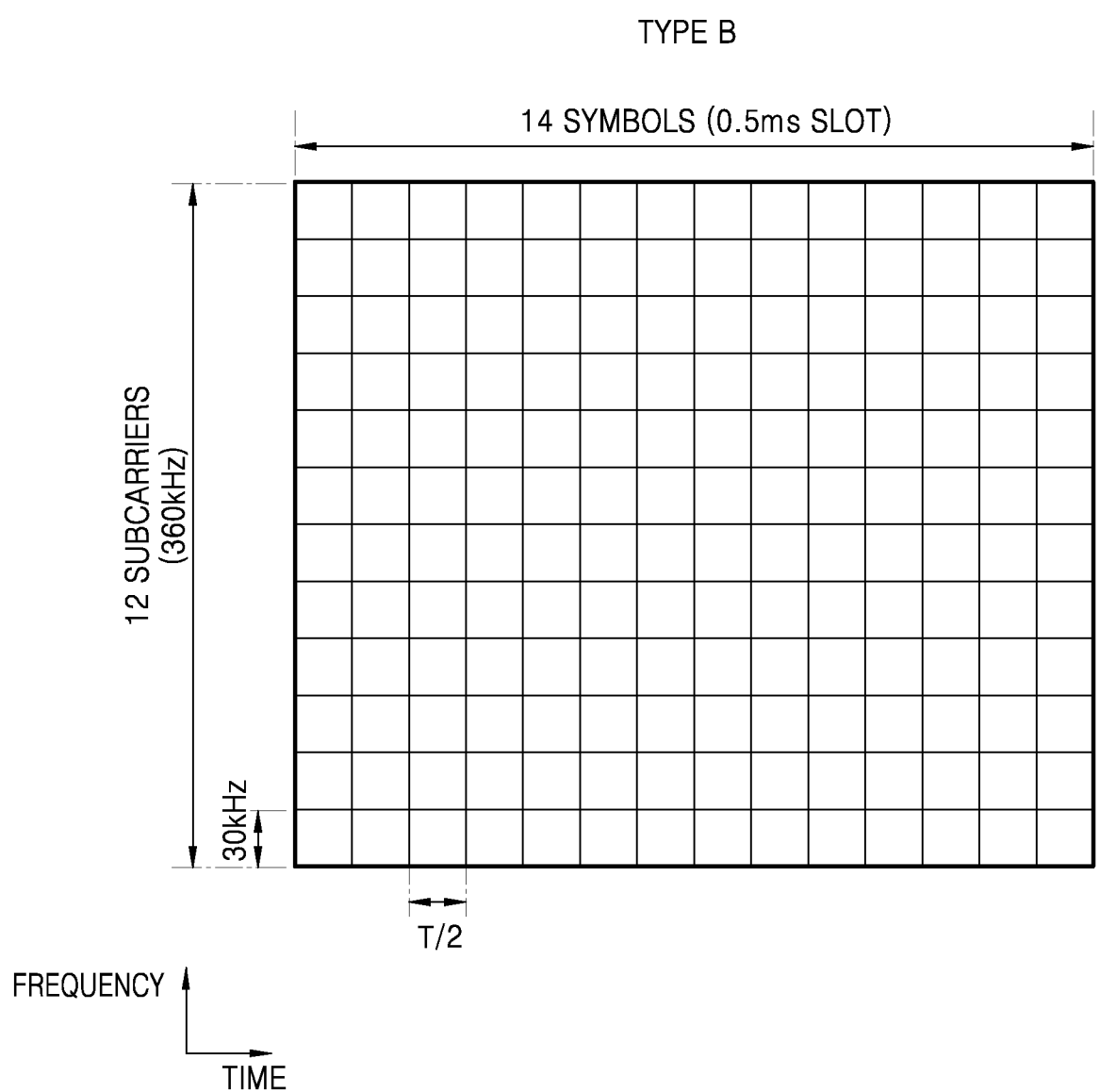
FIG. 3 is an illustration of an extended frame structure according to an embodiment.

FIG. 3 is an illustration of an extended frame structure according to an embodiment.

Referring to FIG. 3, a frame structure type B is illustrated in which a subcarrier spacing is 30 kHz, 14 symbols configures a 0.5-ms slot, and 12 subcarriers (=360 kHz=12× 30 kHz) configures a PRB. That is, the subcarrier spacing and the PRB size of the frame structure type B may be two times greater than those of the frame structure type A, and the slot length and the symbol length of the frame structure type B may be half those of the frame structure type A.

Figure 4:
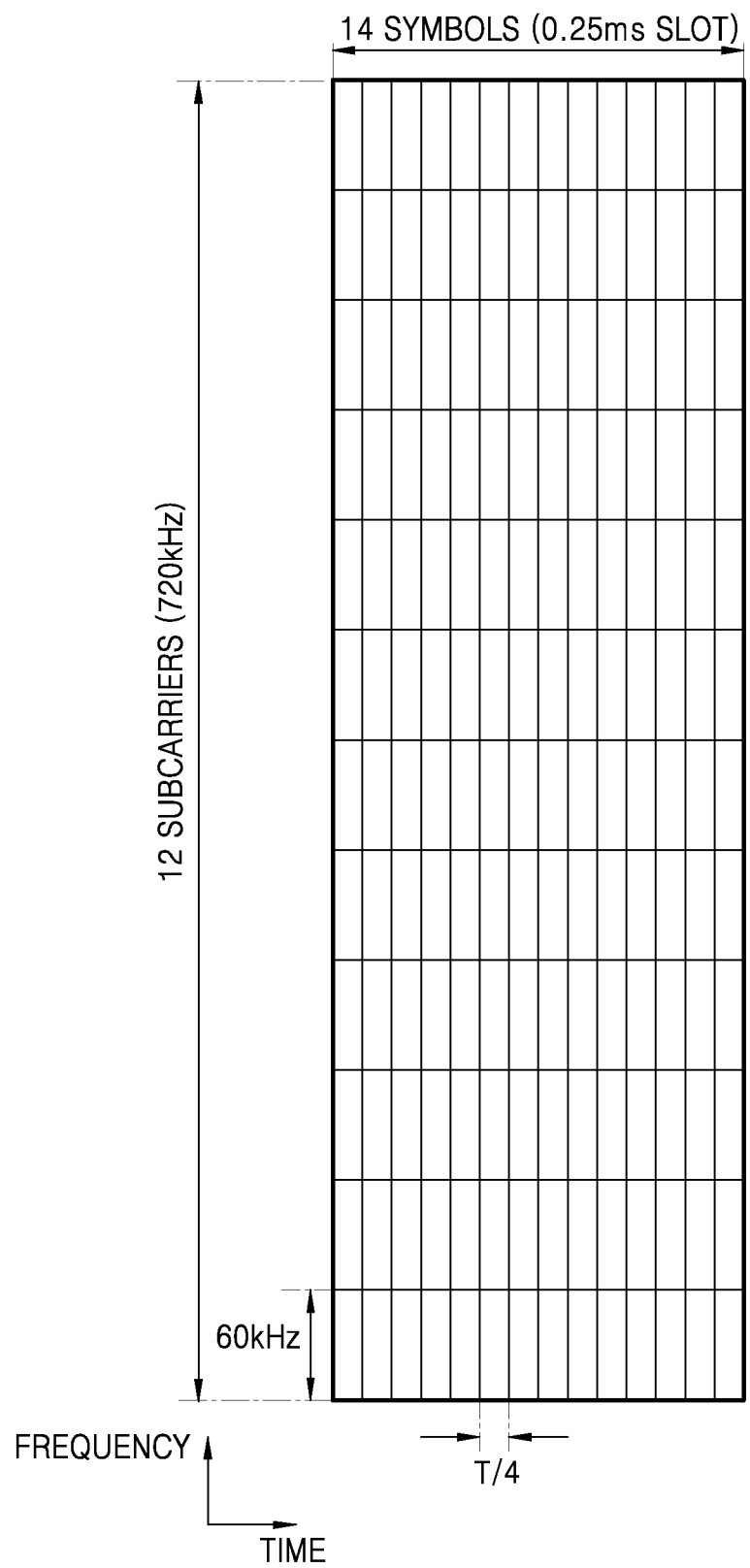
FIG. 4 is an illustration of an extended frame structure according to an embodiment.

FIG. 4 is an illustration of an extended frame structure according to an embodiment.

Referring to FIG. 4, a frame structure type C is illustrated in which a subcarrier spacing is 60 kHz, 14 symbols configures a 0.25-ms slot, and 12 subcarriers (=720 kHz=12×60 kHz) configures a PRB. That is, the subcarrier spacing and the PRB size of the frame structure type C may be four times greater than those of the frame structure type A, and the slot length and the symbol length of the frame structure type C may be one quarter those of the frame structure type A.

The above-described frame structure types may be generalized as described below. A high scalability may be provided by determining the subcarrier spacing, the CP length, the slot length, etc. included in the essential parameter set of a frame structure type, to be an integer times greater than or an integer fraction of those of other frame structure types. A subframe having a fixed length of 1 ms may be defined to indicate a reference time unit regardless of the above-described frame structure types. Therefore, one subframe may include one slot in the frame structure type A, include two slots in the frame structure type B, and include four slots in the frame structure type C.

The above frame structure types may be applied to various scenarios. In view of a cell size, because a longer CP length may support a larger cell, the frame structure type A may support a larger cell compared to the frame structure types B and C. In view of an operating frequency band, because a larger subcarrier spacing is more advantageous for phase noise recovery in a high frequency band, the frame structure type C may support a higher operating frequency compared to the frame structure types A and B. In view of a service, because a shorter length of a slot serving as a basic time unit for scheduling is more advantageous to support an ultra-low latency service such as URLLC, the frame structure type C may be more appropriate for the URLLC service as compared to the frame structure types A and B.

The above-described multiple frame structure types may be multiplexed and integrally utilized in one system.

Table 1 below shows correlations between a subcarrier spacing applied to a synchronization signal, a subcarrier spacing applied to a data or control channel, and an operating frequency band of a system, which are included in an essential parameter set for defining the above-described extended frame structure. A UE may establish time/frequency synchronization with the most appropriate cell by performing a cell search in an initial access operation for accessing the system, and obtain system information from the cell. A synchronization signal is a reference signal for the cell search, and a subcarrier spacing appropriate for a channel environment, e.g., phase noise, may be applied per frequency band. A different subcarrier spacing may be applied to the data or control channel based on a service type to support various services as described above. However, the cell search is performed before the UE starts to transmit or receive data, and an unnecessary increase in complexity of the UE must be minimized. Therefore, the subcarrier spacing applied to the synchronization signal may be maintained as a single value within a frequency band in which the UE performs the cell search. According to the example of Table 1 below, in a frequency band A, the subcarrier spacing applied to the synchronization signal may be defined as a single value of 15 kHz, and the subcarrier spacing applied to the data or control channel may be defined as multiple values of 15 kHz, 30 kHz, and 60 kHz. In a frequency band B, the subcarrier spacing applied to the synchronization signal may be defined as a single value of 30 kHz, and the subcarrier spacing applied to the data or control channel may be defined as multiple values of 15 kHz, 30 kHz, and 60 kHz. The subcarrier spacing actually applied to the data or control channel may be signaled from a BS to the UE through upper layer signaling or physical layer signaling. In Table 1 below, it is assumed that frequency bands A, B, C, and D satisfy A<B<C<D.

TABLE 1

| | Subcarrier spacing per frequency band | |
|---|---|---|
| Frequency band | Subcarrier spacing (synchronization signal) | Subcarrier spacing (data channel) |
| A | 15 kHz | 15, 30, 60 kHz |
| B | 30 kHz | 15, 30, 60 kHz |
| C | 120 kHz | 60, 120 kHz |
| D | 240 kHz | 60, 120 kHz |

Figure 5:
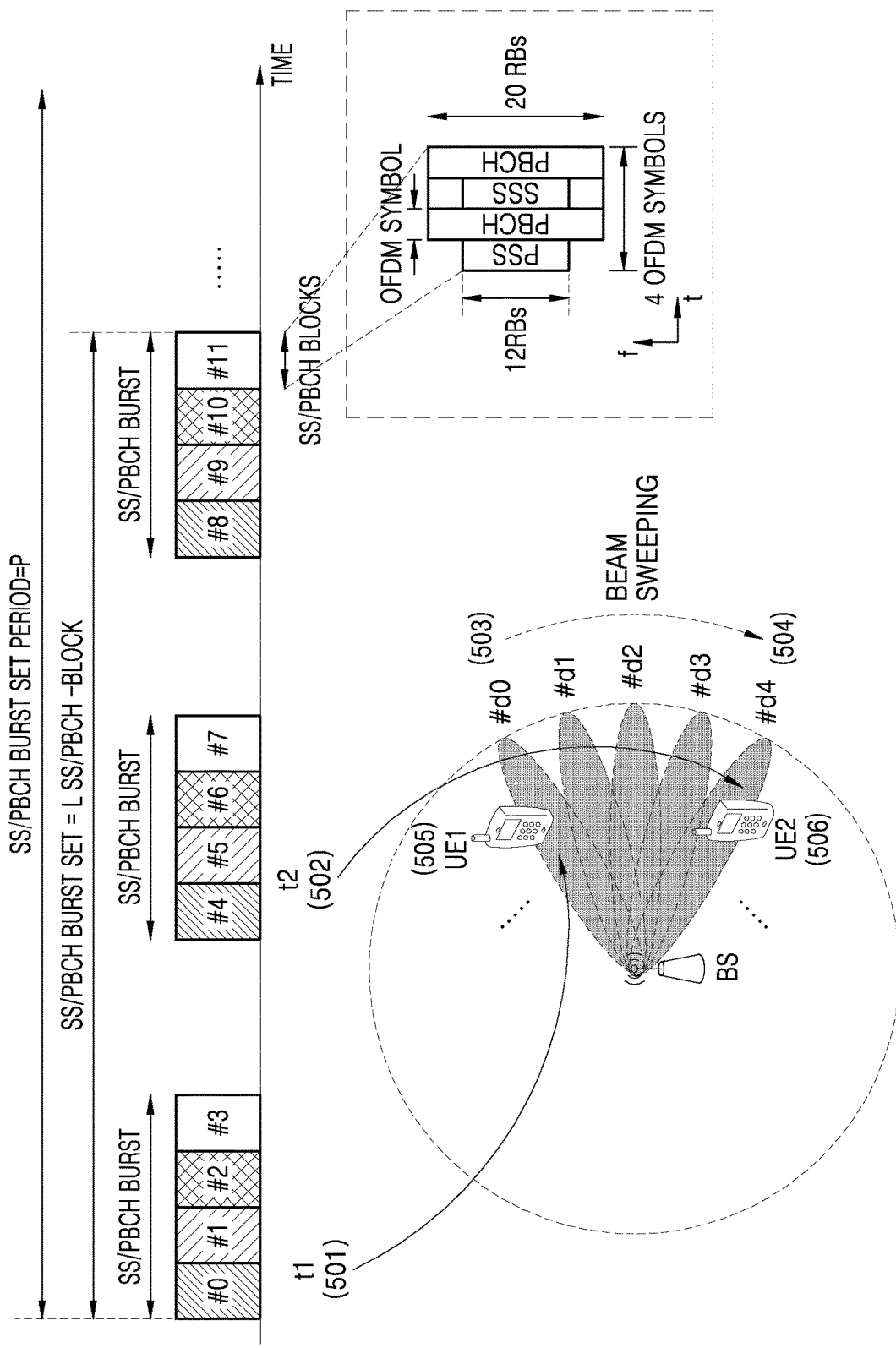
FIG. 5 is an illustration of a time-domain mapping structure of a synchronization signal and a beam sweeping operation, according to an embodiment.

FIG. 5 is an illustration of a time-domain mapping structure of a synchronization signal and a beam sweeping operation, according to an embodiment of the disclosure. The following elements are defined to describe the current embodiment.

Primary synchronization signal (PSS): It serves as a reference signal for DL time/frequency synchronization and may provide a part of cell identity (ID) information.

Secondary synchronization signal (SSS): It serves as a reference signal for DL time/frequency synchronization and may provide the other part of the cell ID information. It may also serve as a reference signal for PBCH demodulation.

Physical broadcast channel (PBCH) signal: It may provide essential system information required for data and control channel transmission and reception of a UE. The essential system information may include search-space-related control information indicating radio resource mapping information of a control channel, and scheduling control information of a data channel for transmitting system information.

Synchronization signal (SS) block or SS/PBCH block): The SS block may include N OFDM symbols and consist of a combination of the PSS, the SSS, and the PBCH signal. In a system using beam sweeping technology, the SS block is the smallest unit for applying beam sweeping to a synchronization signal. In the example of FIG. 5, one SS block may include 4 OFDM symbols sequentially mapped to 1 PSS symbol, 1 PBCH symbol, 1 SSS/PBCH symbol, and another 1 PBCH symbol. The frequency domain of the PSS and the SSS may have a size of 12 RBs, and the frequency domain of the PBCH signal may have a size up to 20 RBs.

SS burst: The SS burst may include one or more SS blocks. In the example of FIG. 5, each SS burst may include four SS blocks.

SS burst set: It may include one or more SS bursts and include a total of L SS blocks. In the example of FIG. 5, the SS burst set may include a total of 12 SS blocks. The SS burst set is cyclically repeated in units of a certain period P. Herein, the period P may be defined as a fixed value based on a frequency band, or may be signaled from a BS to the UE. When the period P is not signaled, the UE may apply a preset default value.

FIG. 5 shows that beam sweeping is applied in units of an SS block as time passes. In the example of FIG. 5, due to beamforming applied to SS block #0 at a timing t1 501, a first UE (UE1) 505 may receive an SS block based on a beam radiated in direction #d0 503. Due to beamforming applied to SS block #4 at a timing t2 502, a second UE (UE2) 506 may receive an SS block based on a beam radiated in direction #d4 504. A UE may obtain an optimal synchronization signal based on a beam radiated from a BS in a direction toward the location of the UE. For example, the UE1 505 may not easily obtain a time/frequency synchronization signal and essential system information from an SS block based on the beam radiated in the direction #d4 504 toward a location spaced apart from the UE1 505.

To achieve ultra-low latency services in a 5G system, in addition to adoption and utilization of the above-described extended frame structure, research is being conducted on self-contained transmission by which DL data transmission and hybrid automatic repeat request (HARQ)-acknowledgment (ACK)/negative ACK (NACK) feedback on the DL data are performed within a slot serving as a basic unit for scheduling. In view of UL data transmission, self-contained transmission refers to a transmission method by which scheduling information of a BS for scheduling UL data of a UE and UL data of the UE, corresponding to the scheduling information are transmitted in the same slot. At least 6 slot formats (e.g., slot format 1 to slot format 6) required to support self-contained transmission is described below with reference to FIG. 6.

Figure 6:
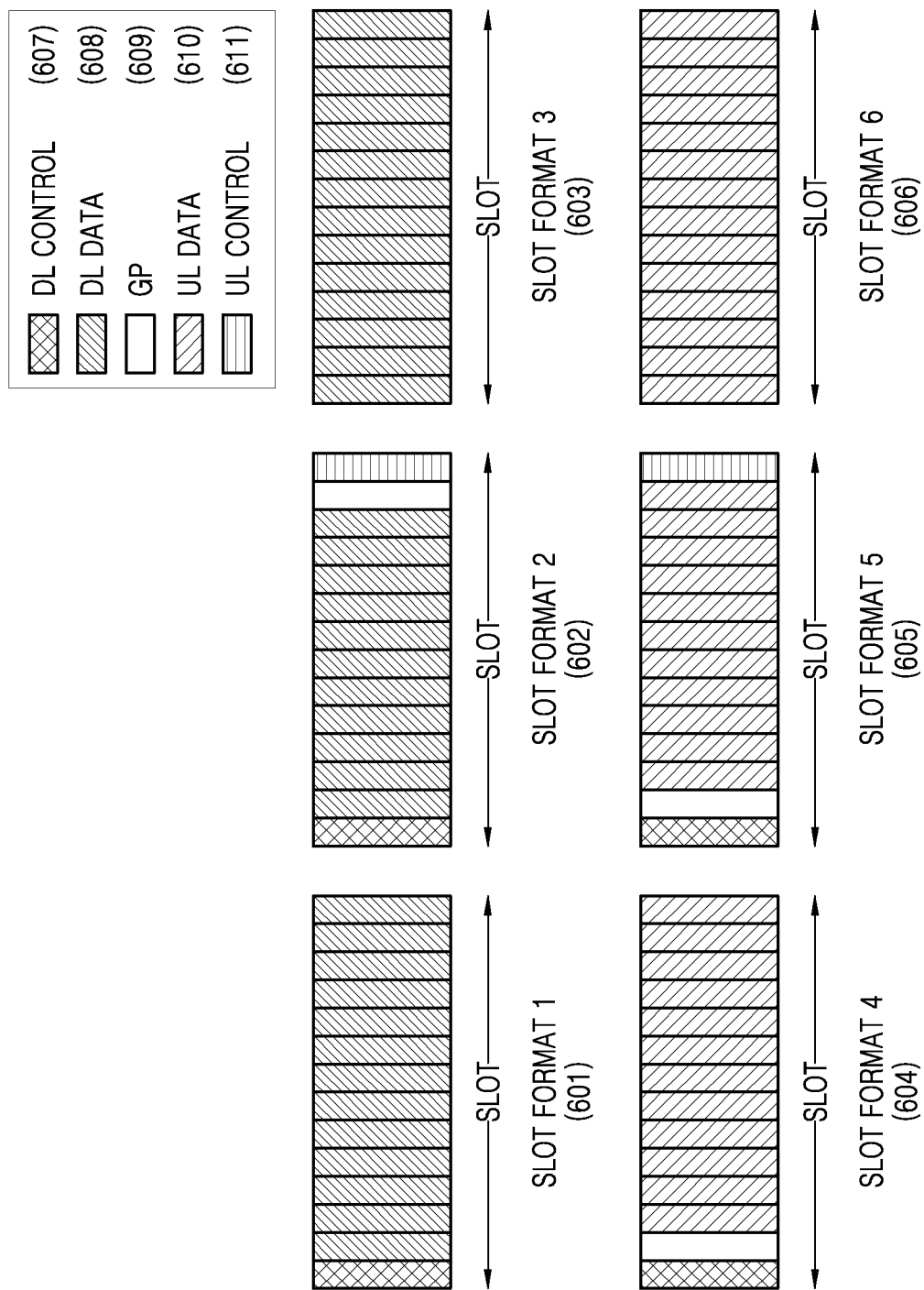
FIG. 6 is an illustration of slot formats for supporting self-contained transmission, according to an embodiment.

FIG. 6 is an illustration of slot formats for supporting self-contained transmission, according to an embodiment.

Referring to FIG. 6, each slot may include a total of 14 symbols. Each slot format may be defined as a combination of a symbol 607 for transmitting DL control information, a symbol 608 for transmitting DL data, a guard period (GP) symbol 609 for DL-UL switching, a symbol 610 for transmitting UL data, and a symbol 611 for transmitting UL control information. Each slot format may include various combinations of symbols based on the amount of control information to be transmitted, the amount of data to be transmitted, and a time required by a UE to switch a radio frequency (RF) module from a DL mode to a UL mode. A BS may signal, to the UE, control information about one of the various slot formats to be applied.

A slot format 1 601, a slot format 2 602, and a slot format 3 603 are slot formats for DL data transmission.

The slot format 1 601 indicates a slot including at least one symbol for transmitting DL control information and at least one symbol for transmitting DL data, and all symbols may be used for DL transmission.

The slot format 2 602 indicates a slot including at least one symbol for transmitting DL control information, at least one symbol for transmitting DL data, at least one GP symbol, and at least one symbol for transmitting UL control information, and symbols for DL transmission and symbols for UL transmission may coexist within one slot. Therefore, DL self-contained transmission may be supported based on the slot format 2 602.

The slot format 3 603 may indicate a slot including all symbols for transmitting DL data. Therefore, the slot format 3 603 may minimize overhead of control information transmission and maximize the efficiency of DL data transmission.

A slot format 4 604, a slot format 5 605, and a slot format 6 606 are slot formats for UL data transmission.

The slot format 4 604 indicates a slot including at least one symbol for transmitting DL control information, at least one GP symbol, and at least one symbol for transmitting UL data. That is, because symbols for DL transmission and symbols for UL transmission coexist within one slot, UL self-contained transmission may be supported based on the slot format 4 604.

The slot format 5 605 indicates a slot including at least one symbol for transmitting DL control information, at least one GP symbol, at least one symbol for transmitting UL data, and at least one symbol for transmitting UL control information. That is, because symbols for DL transmission and symbols for UL transmission coexist within one slot, DL self-contained transmission may be supported based on the slot format 5 605.

The slot format 6 606 may indicate a slot including all symbols for transmitting UL data. Therefore, the slot format 6 606 may minimize overhead of control information transmission and maximize the efficiency of UL data transmission.

Mapping of the time domain of SS blocks is influenced by an extended frame structure, information about whether to apply beam sweeping, and a self-contained transmission method.

DL control information, DL data, UL control information, UL data, and a GP may be mapped to symbols to which the SS blocks are not mapped within one slot.

To reduce the complexity of SS block detection of the UE, a fixed mapping pattern preset between the UE and the BS must be defined.

As described above in relation to Table 1 above, a subcarrier spacing applied to a synchronization signal per frequency band may be defined as a single value, and a subcarrier spacing applied to a data or control channel may be defined as multiple values.

An initial access operation in which the UE performs cell search through SS block detection is performed before the UE starts to transmit or receive data. When multiple subcarrier spacing values are applied to a data or control channel, the UE may not clearly know which subcarrier spacing is actually applied to the data or control channel. Therefore, the time domain of the SS blocks must be mapped to reduce the complexity of an SS block detection operation of the UE by defining the time domain of the SS blocks regardless of the subcarrier spacing of the data or control channel.

That is, because a data/control channel frame structure is separate from a synchronization signal frame structure, the SS blocks may be mapped to fixed locations based on the synchronization signal frame structure regardless of the data/control channel frame structure.

A mapping pattern of SS blocks per subcarrier spacing of a synchronization signal is described below with reference to FIGS. 7, 8, 9, and 10. The maximum number L of SS blocks included in a SS burst set per subcarrier spacing of a synchronization signal may be defined as shown in Table 2 below. As described above, a larger subcarrier spacing is more advantageous for phase noise recovery in a high frequency band and thus is more appropriate for operation in an ultra-high frequency band. However, in this case, a beam sweeping operation using a small beam width must be performed multiple times to compensate for path loss in the ultra-high frequency band. A synchronization signal having a different beam direction may be mapped to each SS block. Therefore, according to Table 2 below, when a subcarrier spacing of a synchronization signal is 240 kHz, up to 64 different beams may be supported.

TABLE 2

Maximum number of SS blocks per subcarrier

| Subcarrier spacing (synchronization signal) | Maximum number (L) of SS blocks |
| --- | --- |
| 15 kHz | 4 or 8 |
| 30 kHz | 4 or 8 |
| 120 kHz | 64 |
| 240 kHz | 64 |

To prevent a synchronization signal detection operation of a UE from being unnecessarily lengthened, the SS blocks may be defined to be mapped within up to 5 ms of a time window for synchronization signal detection.

Figure 7:
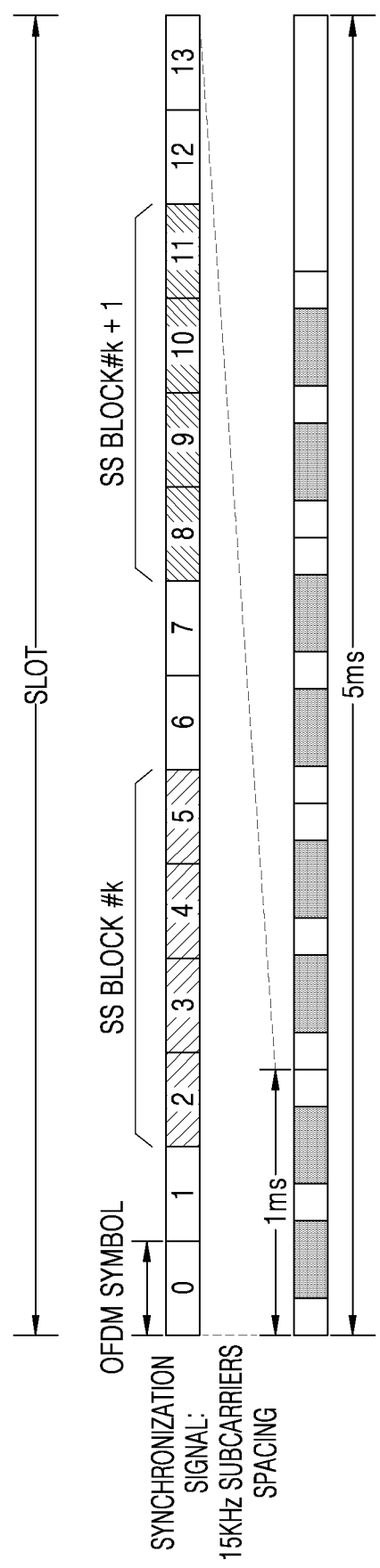
FIG. 7 is an illustration of a mapping pattern of synchronization signal (SS) blocks in a case when a subcarrier spacing of a synchronization signal is 15 kHz, according to an embodiment.

FIG. 7 is an illustration of a mapping pattern of SS blocks in a case when a subcarrier spacing of a synchronization signal is 15 kHz, according to an embodiment.

Referring to FIG. 7, during a 1-ms slot including 14 OFDM symbols, two SS blocks such as SS blocks #k and #k+1 may be mapped. The SS block #k may include OFDM symbols 2, 3, 4, and 5, and the SS block #k+1 may include OFDM symbols 8, 9, 10, and 11. The mapping pattern of the SS blocks #k and #k+1 may be repeated and up to eight SS blocks may be mapped within a 5-ms time window for synchronization signal detection.

Figure 8:
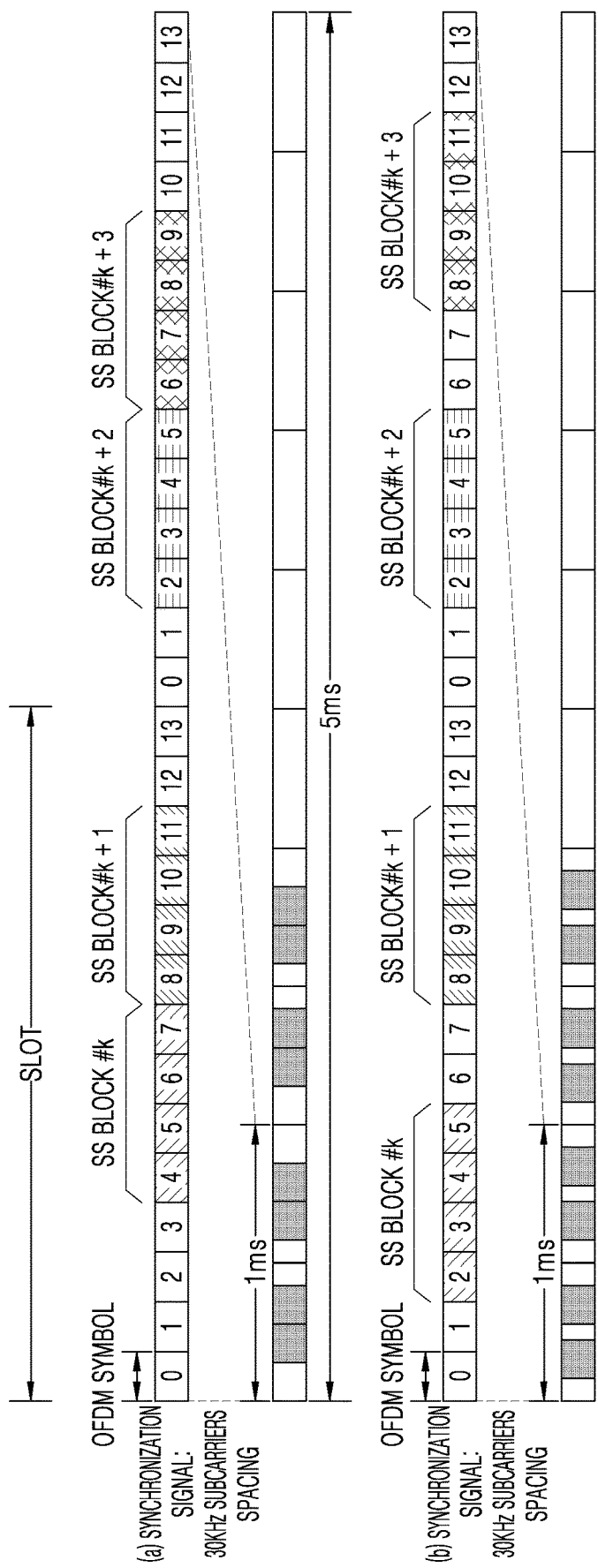
FIG. 8 is an illustration of a mapping pattern of SS blocks in a case when a subcarrier spacing of a synchronization signal is 30 kHz, according to an embodiment.

FIG. 8 is an illustration of a mapping pattern of SS blocks in a case when a subcarrier spacing of a synchronization signal is 30 kHz, according to an embodiment.

Referring to FIG. 8, over two 0.5-ms slots each including 14 OFDM symbols (i.e., over a total of 28 OFDM symbols), a total of four SS blocks such as SS blocks #k, #k+1, #k+2, and #k+3 may be mapped.

The SS block #k may include OFDM symbols 4, 5, 6, and 7 of a first slot, the SS block #k+1 may include OFDM symbols 8, 9, 10, and 11 of the first slot, the SS block #k+2 may include OFDM symbols 2, 3, 4, and 5 of a second slot, and the SS block #k+3 may include OFDM symbols 6, 7, 8, and 9 of the second slot.

The mapping pattern of the SS blocks #k, #k+1, #k+2, and #k+3 may be repeated and up to eight SS blocks may be mapped within a 5-ms time window for synchronization signal detection.

In another mapping pattern of SS blocks, the SS block #k may include OFDM symbols 2, 3, 4, and 5 of the first slot, the SS block #k+1 may include OFDM symbols 8, 9, 10, and 11 of the first slot, the SS block #k+2 may include OFDM symbols 2, 3, 4, and 5 of the second slot, and the SS block #k+3 may include OFDM symbols 8, 9, 10, and 11 of the second slot.

The mapping pattern of the SS blocks #k, #k+1, #k+2, and #k+3 may be repeated and up to eight SS blocks may be mapped within a 5-ms time window for synchronization signal detection.

FIG. 9 is an illustration of a mapping pattern of SS blocks in a case when a subcarrier spacing of a synchronization signal is 120 kHz, according to an embodiment.

Referring to FIG. 9, over two 0.125-ms slots each including 14 OFDM symbols (i.e., over a total of 28 OFDM symbols), a total of four SS blocks such as SS blocks #k, #k+1, #k+2, and #k+3 may be mapped. The SS block #k may include OFDM symbols 4, 5, 6, and 7 of a first slot, the SS block #k+1 may include OFDM symbols 8, 9, 10, and 11 of the first slot, the SS block #k+2 may include OFDM symbols 2, 3, 4, and 5 of a second slot, and the SS block #k+3 may include OFDM symbols 6, 7, 8, and 9 of the second slot.

The mapping pattern of the SS blocks #k, #k+1, #k+2, and #k+3 may be repeated and up to 64 SS blocks may be mapped within a 5-ms time window for synchronization signal detection.

FIG. 10 is an illustration of a mapping pattern of SS blocks in a case when a subcarrier spacing of a synchronization signal is 240 kHz, according to an embodiment.

Referring to FIG. 10, over four 0.0625-ms slots each including 14 OFDM symbols (i.e., over a total of 56 OFDM symbols), a total of eight SS blocks such as SS blocks #k, #k+1, #k+2, #k+3, #k+4, #k+5, #k+6, and #k+7 may be mapped. The SS block #k may include OFDM symbols 8, 9, 10, and 11 of a first slot, the SS block #k+1 may include OFDM symbols 12 and 13 of the first slot and OFDM symbols 0 and 1 of a second slot, the SS block #k+2 may include OFDM symbols 2, 3, 4, and 5 of the second slot, and the SS block #k+3 may include OFDM symbols 6, 7, 8, and 9 of the second slot.

The SS block #k+4 may include OFDM symbols 4, 5, 6, and 7 of a third slot, the SS block #k+5 may include OFDM symbols 8, 9, 10, and 11 of the third slot, the SS block #k+6 may include OFDM symbols 12 and 13 of the third slot and OFDM symbols 0 and 1 of a fourth slot, and the SS block #k+7 may include OFDM symbols 2, 3, 4, and 5 of the fourth slot.

The mapping pattern of the SS blocks #k, #k+1, #k+2, #k+3, #k+4, #k+5, #k+6, and #k+7 may be repeated and up to 64 SS blocks may be mapped within a 5-ms time window for synchronization signal detection.

A BS may transmit SS blocks based on at least two methods described below, by using the mapping patterns of the SS blocks, which are defined above in relation to FIGS. 7, 8, 9, and 10.

Method 1 (beam sweeping): As described above in relation to FIG. 5, the BS may transmit each SS block by applying a different beamforming technology thereto to change a beam direction. Method 1 is useful as a method of compensating for path loss in an ultra-high frequency band. Because a large subcarrier spacing is applied for phase noise recovery in the ultra-high frequency band, a symbol interval is short and a beam sweeping operation may be completed within a short time.

Method 2 (repetition): As another method of increasing coverage of an SS block, the BS may repeatedly transmit equal SS blocks and the UE may expect coverage expansion by combining the repeated transmitted SS blocks.

Embodiments of the disclosure related to Method 2 corresponding to repetition is described below.

Embodiment 1 of the disclosure corresponds to a method, performed by a UE, of combining SS blocks repeatedly transmitted by the BS. The method is described with reference to FIG. 11.

Figure 11:
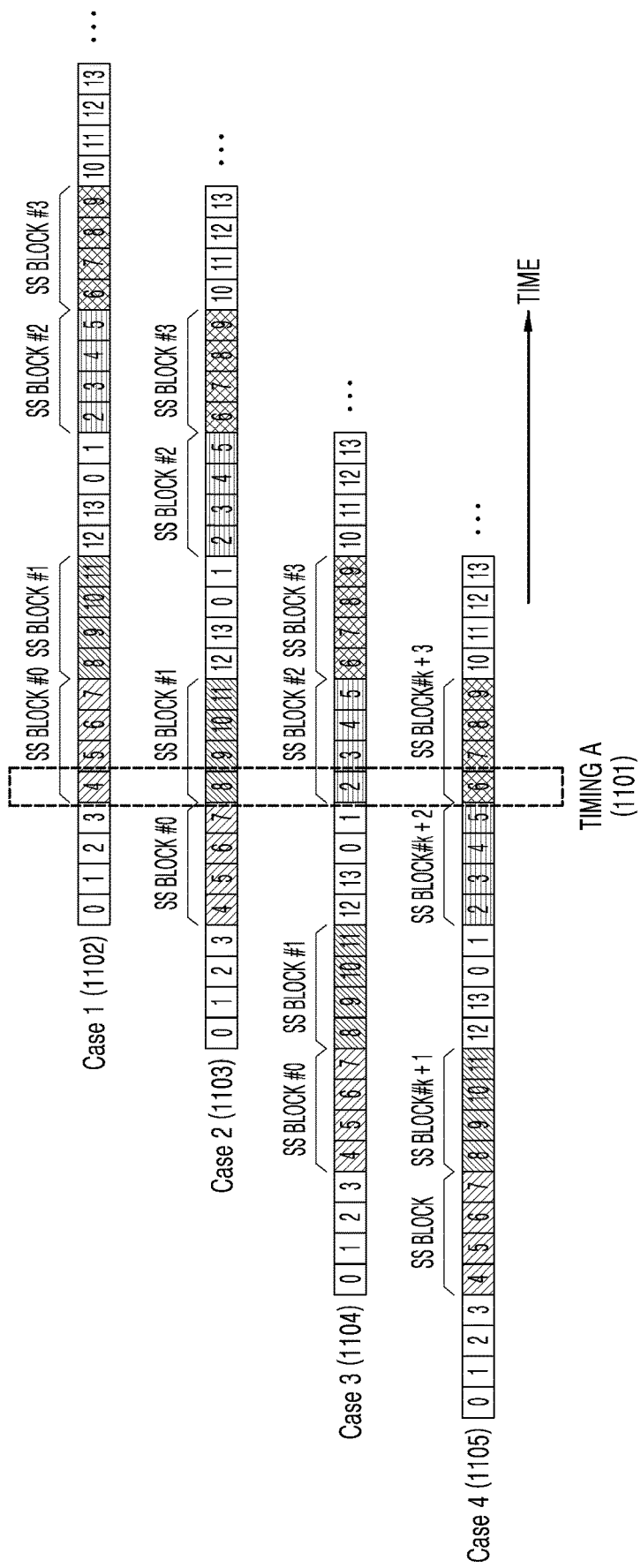
FIG. 11 is an illustration of a method, performed by a UE of combining SS blocks, according to an embodiment.

FIG. 11 is an illustration of a method, performed by a UE, of combining SS blocks, according to an embodiment.

Referring to FIG. 11, when a subcarrier spacing of a synchronization signal is 30 kHz, example cases of the mapping pattern of SS blocks of FIG. 8 are shown. It is assumed in FIG. 11 that a BS repeatedly transmits a total of four SS blocks such as SS blocks 0, 1, 2, and 3. Therefore, a UE may improve reception performance or expand coverage by combining the repeated transmitted SS blocks.

Initially, the UE desired to perform an initial access procedure may attempt to detect a PSS transmitted from the BS. As described above, the PSS may be located at the first symbol of an SS block including four symbols. Because the UE does not have preliminary information about a timing, the UE may blindly attempt PSS detection and set a detected PSS as a candidate PSS when a received strength of the PSS exceeds a certain threshold value. However, because the PSS does not have timing information of an SS block, the UE may not identify an SS block including the successfully detected PSS.

Although the UE has successfully detected the PSS at a Timing A 1101, the UE may not know to which one of the SS blocks 0, 1, 2, and 3 the PSS belongs. That is, the UE may not determine one of Case 1 1102, Case 2 1103, Case 3 1104, and Case 4 1105. When the UE knows that SS blocks are repeatedly transmitted, the method, performed by the UE, of combining the SS blocks may vary based on cases as described below.

Case 1: When the UE recognizes that the PSS received at the timing A 1101 belongs to the SS block 0, the UE may improve reception performance of the PSS by combining the PSS of the SS block 0, a PSS of the SS block 1 received after 4 symbols from the timing A 1101, a PSS of the SS block 2 received after 12 symbols from the timing A 1101, and a PSS of the SS block 3 received after 16 symbols from the timing A 1101.

Case 2: When the UE recognizes that the PSS received at the timing A 1101 belongs to the SS block 1, the UE may improve reception performance of the PSS by combining the PSS of the SS block 1, a PSS of the SS block 2 received after 8 symbols from the timing A 1101, and a PSS of the SS block 3 received after 12 symbols from the timing A 1101.

Case 3: When the UE recognizes that the PSS received at the timing A 1101 belongs to the SS block 2, the UE may improve reception performance of the PSS by combining the PSS of the SS block 2 and a PSS of the SS block 3 received after 4 symbols from the timing A 1101.

Case 4: When the UE recognizes that the PSS received at the timing A 1101 belongs to the SS block 3, the UE may detect only the PSS of the SS block 3 without combining PSSs.

Because the UE may not determine one of Cases 1, 2, 3, and 4 based on only the PSS detected at the timing A 1101 as described above, to improve reception performance of the PSS, all PSS combining operations based on Cases 1, 2, 3, and 4 may be performed and then a case having the best performance may be finally selected.

Various cases occur as described above because time intervals between repeatedly transmitted SS blocks are not equal. The combining operation may be generalized as described below.

Assumption: It is assumed that the BS transmits a total of L SS blocks (e.g., SS blocks #k, #k+1, #k+2, . . . , #k+L−1) during an SS block transmission period P. The BS may transmit the SS blocks by mapping the SS blocks in the time domain in the order of indices thereof. A time interval between two SS blocks may be expressed as t(x, y). For example, the time interval between the SS blocks #k and #k+1 is t(k, k+1). The time interval may be expressed as the number of symbols, and a preset value may be used. That is, the UE knows of relative time-domain mapping relationships between the L SS blocks. However, the UE may not identify an SS block to which an initially detected PSS belongs.

UE Operation:

When a received strength of a PSS detected by the UE at an arbitrary timing exceeds a certain threshold value, the UE sets the PSS as a candidate PSS and assumes that an SS block to which the candidate PSS belongs is SS block #i ($0 \leq i \leq L$).

Within the SS block transmission period P, the UE may calculate reception performance by combining the PSS of the SS block #i and a PSS of a SS block #i+1 located after t(i, i+1) from the SS block #i.

Likewise, within the SS block transmission period P, the UE may calculate reception performance after performing the PSS combining operation for all possible combinations of t(i, j) ($i \neq j$, $0 \leq j \leq L$).

The above-described UE operation may include operations from an operation of detecting at least one PSS (i.e., not combining PSSs) to an operation of combining up to L PSSs.

The UE selects one of all combining results, which has the best reception performance. The UE may assume that the PSSs and the SS blocks used for PSS combining are transmitted from the BS.

The above description has been provided based on PSSs and is equally applicable to SSSs and PBCH signals.

Embodiment 1 of the disclosure may be modified in various ways.

Modified embodiment 1 of the disclosure: When Method 1 (beam sweeping) is applied when the BS transmits SS blocks, the UE may not perform the above-described PSS combining operation. Otherwise, when Method 2 (repetition) is applied when the BS transmits SS blocks, the UE may perform the above-described PSS combining operation. The method to be applied by the BS to transmit SS blocks may be defined based on a frequency band. For example, Method 2 may be applied in a low frequency band and Method 1 may be applied in an ultra-high frequency band.

Modified Embodiment 2 of the disclosure: The UE may not perform the above-described PSS combining operation in a case when a radio channel environment rapidly changes, and may perform the above-described PSS combining operation in a case when the radio channel environment slowly changes. An example of the case when the radio channel environment rapidly changes includes a case when the UE moves at a high speed. In this case, it is expected that the effect of PSS combining is not significant.

Figure 12:
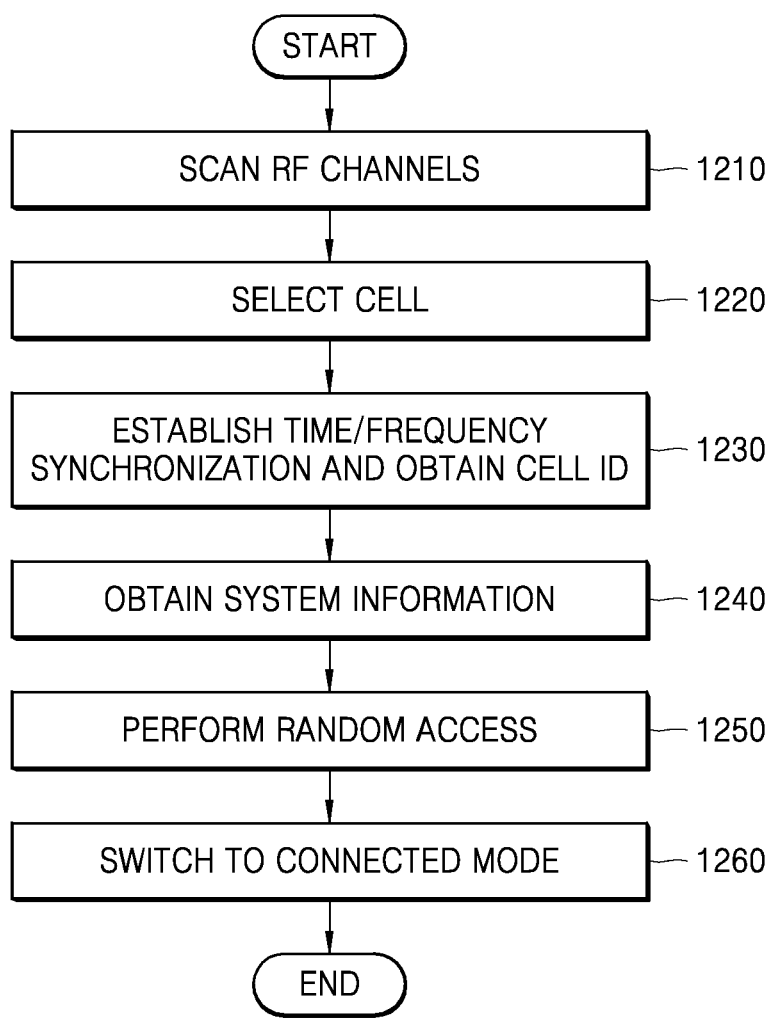
FIG. 12 is a flowchart of a method in which a UE receives an SS block through an initial access procedure and is switched to a connected mode, according to an embodiment.

FIG. 12 is a flowchart of a method in which a UE receives an SS block through an initial access procedure and is switched to a connected mode, according to an embodiment.

Referring to FIG. 12, in step 1210, the UE may scan RF channels supported by the UE, through cell search. This operation corresponds to an initial access operation in which the UE accesses a system. As described above in relation to Table 1 above, the UE may detect a synchronization signal based on a subcarrier spacing of the synchronization signal, which is defined per frequency band. In addition, as described above, the UE may attempt synchronization signal detection at locations to which the synchronization signal is mappable. In this case, a PSS combining operation according to an embodiment of the disclosure may be applied. The cell search procedure may be performed sequentially or simultaneously on a plurality of RF channels based on implementation of the UE.

In step 1220, the UE may select a cell satisfying cell section criteria, based on the results of scanning the RF channels. As an example of the cell section criteria, the UE may select a cell having the highest received strength of the synchronization signal, which exceeds a certain threshold value.

In step 1230, the UE may establish time/frequency synchronization with the selected cell based on the synchronization signal and obtain a cell ID. Additionally, the UE may obtain a beam ID.

In step 1240, the UE may obtain system information. The UE may obtain basic information for communicating with a BS, based on the system information. A part of the system information may be transmitted through a PBCH, and the other part thereof may be transmitted through a data channel for transmitting the system information.

In step 1250, the UE may perform a random access procedure. The UE may establish UL time/frequency synchronization through the random access procedure.

In step 1260, the UE may switch a link with the BS, to a connected mode. When the random access procedure is successfully completed, the UE may switch the link with the BS from an idle state to a connected state and be prepared for data communication with the BS.

Figure 13:
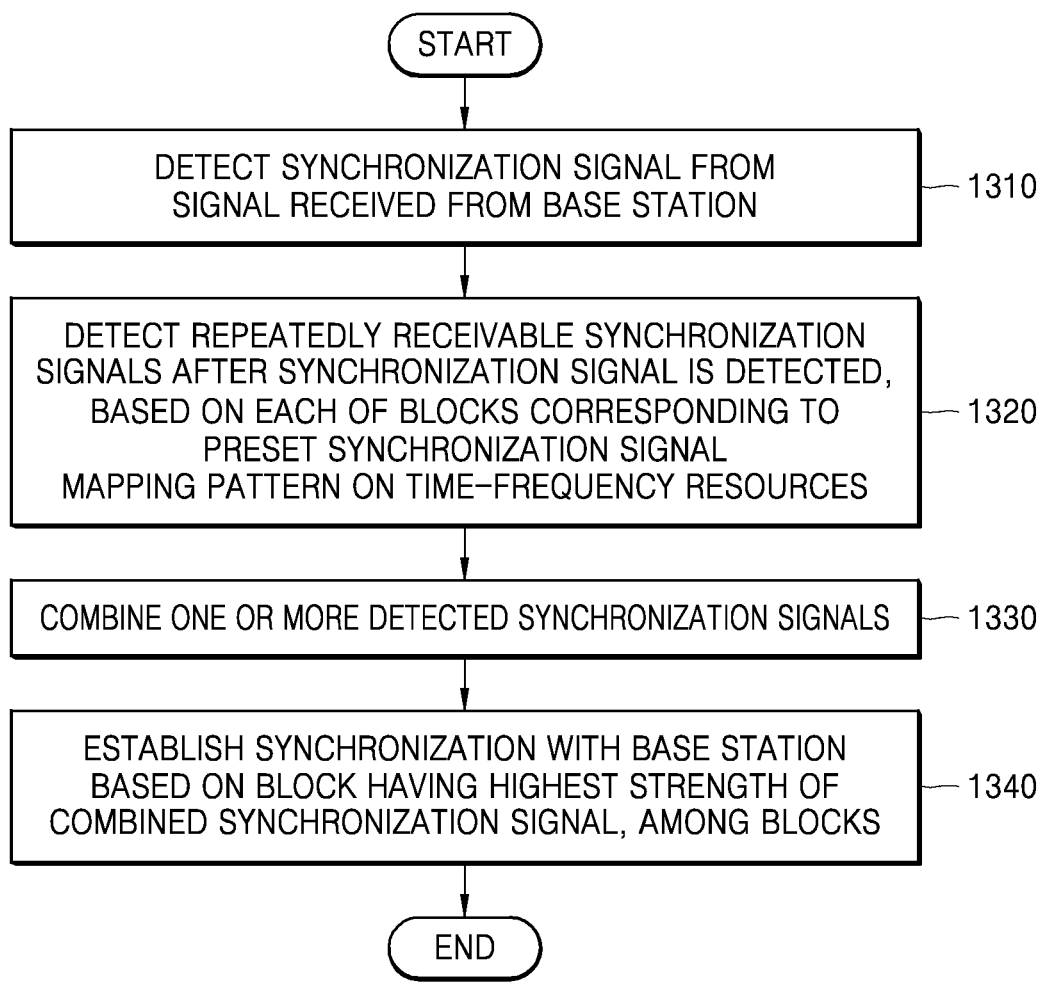
FIG. 13 is a flowchart of a synchronization method of a UE, according to an embodiment.

FIG. 13 is a flowchart of a synchronization method of a UE, according to an embodiment.

Referring to FIG. 13, in step 1310, the UE may detect a synchronization signal from a signal received from a BS. Herein, the synchronization signal may include at least one of a PSS, an SSS, or a PBCH signal, or a combination of at least two of the PSS, the SSS, and the PBCH signal.

For example, the UE may detect the PSS from the signal received from the BS. The UE may blindly attempt PSS detection and detect a PSS when a received strength of the PSS exceeds a certain threshold value. However, the PSS is merely an example and the detection method is equally applicable to the above-described synchronization signals such as the SSS and the PBCH signal.

In step 1320, the UE may detect repeatedly receivable synchronization signals after the synchronization signal is detected, based on each of blocks corresponding to a preset synchronization signal mapping pattern on time-frequency resources. Herein, the blocks may be the above-described SS blocks.

Step 1320 may correspond to the synchronization signal detection method in Cases 1, 2, 3, and 4 according to Embodiment 1 above of the disclosure.

In step 1330, the UE may combine the one or more detected synchronization signals.

In step 1340, the UE may establish synchronization with the BS based on a block having the highest strength of the combined synchronization signal, among the blocks.

The UE according to an embodiment of the disclosure may assume that the synchronization signal at the block having the highest strength of the combined synchronization signal is the synchronization signal detected by the UE in step 1310.

Figure 14:
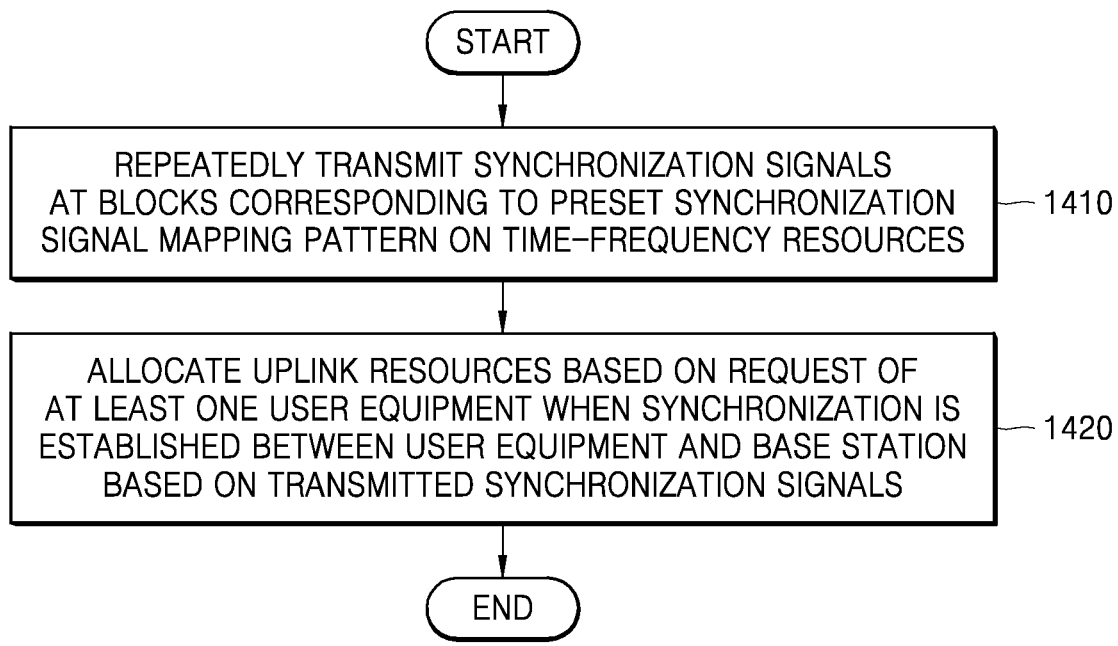
FIG. 14 is a flowchart of a synchronization method of a BS, according to an embodiment.

FIG. 14 is a flowchart of a synchronization method of a BS, according to an embodiment.

Referring to FIG. 14, in step 1410, the BS may repeatedly transmit synchronization signals at blocks corresponding to a preset synchronization signal mapping pattern on time-frequency resources. Herein, the synchronization signal may include at least one of a PSS, an SSS, or a PBCH signal, or a combination of at least two of the PSS, the SSS, or the PBCH signal. The synchronization signal mapping pattern may be set based on a subcarrier spacing determined per frequency band.

In step 1420, the BS may allocate UL resources based on a request of at least one UE when synchronization is established between the UE and the BS based on the transmitted synchronization signals.

According to an embodiment of the disclosure, one or more synchronization signals detected by the UE based on each of the blocks corresponding to the synchronization signal mapping pattern may be combined and synchronization may be established between the UE and the BS based on a block having the highest strength of the combined synchronization signal.

Figure 15:
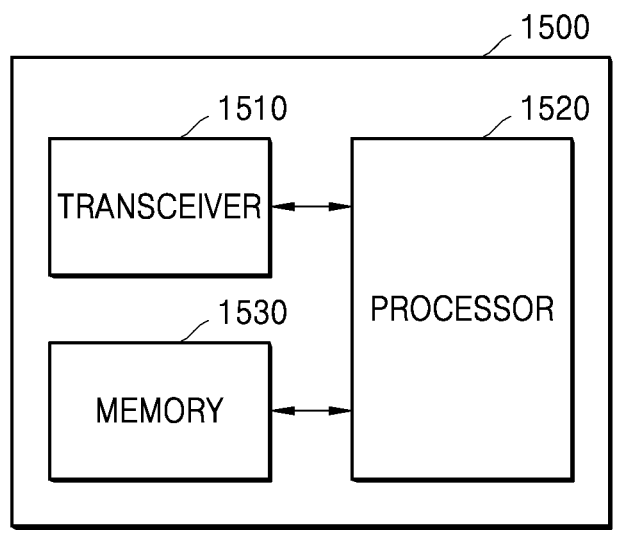
FIG. 15 is a block diagram of a UE, according to an embodiment.

FIG. 15 is a block diagram of a UE 1500 according to an embodiment.

Referring to FIG. 15, the UE 1500 may include a transceiver 1510, a processor 1520, and a memory 1530. The transceiver 1510, the processor 1520, and the memory 1530 of the UE 1500 may operate based on the synchronization methods described above in the previous embodiments of the disclosure. However, components of the UE 1500 are not intended to be limited to the above-mentioned components. The UE 1500 may include a larger or smaller number of components as compared to the above-mentioned components. In some cases, the transceiver 1510, the processor 1520, and the memory 1530 may be configured as a single integrated circuit or chip.

The transceiver 1510 may transmit or receive a signal to or from a BS. Herein, the signal may include a synchronization signal, control information, and data. To this end, the transceiver 1510 may include an RF transmitter configured to up-convert and amplify a ffequency of a transmitted signal, and an RF receiver configured to low-noise-amplify a received signal and to down-convert a frequency of the received signal. However, the RF transmitter and the RF receiver are merely examples, and the components of the transceiver 1510 are not intended to be limited thereto.

The transceiver 1510 may receive a signal through a radio channel and output the signal to the processor 1520, and transmit a signal output from the processor 1520, through the radio channel.

The processor 1520 may control a series of procedures to operate the UE 1500 according to the afore-described embodiments of the disclosure. For example, when at least one synchronization signal is received from the BS through the transceiver 1510, the processor 1520 may perform the synchronization methods according to the afore-described embodiments of the disclosure.

The memory 1530 may store the control information or data included in the signal obtained by the UE 1500, and have an area for storing data required for or generated due to control operation of the processor 1520 to perform the above-described synchronization methods. The memory 1530 may be configured in various forms, e.g., a read-only memory (ROM), a random access memory (RAM), a hard disk, a compact disc-ROM (CD-ROM), and/or a digital versatile disc (DVD).

Figure 16:
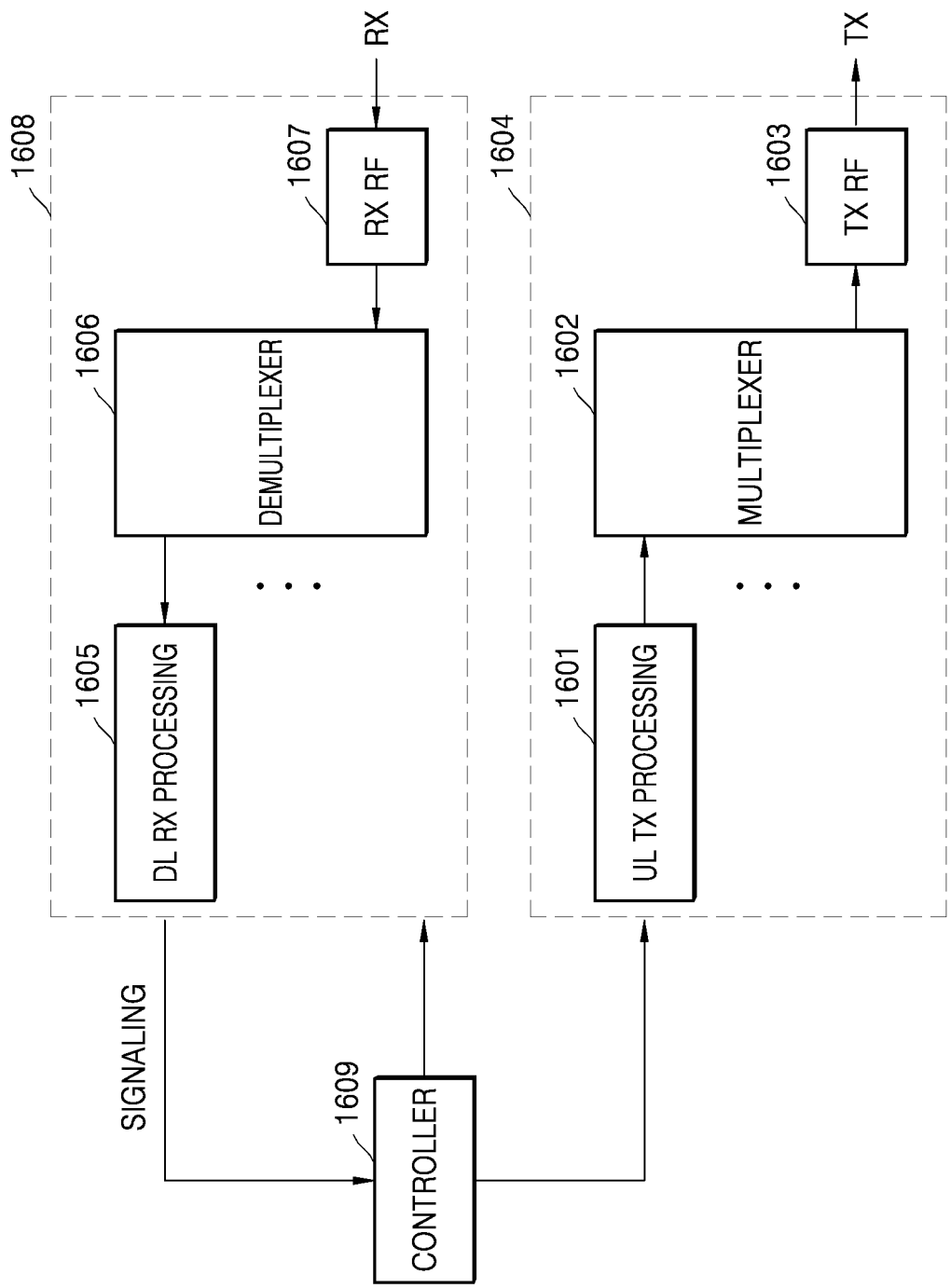
FIG. 16 is a block diagram of a UE, according to an embodiment.

FIG. 16 is a block diagram of a UE 1600 according to an embodiment. Devices not directly related to the embodiment of the disclosure are not illustrated or described.

Referring to FIG. 16, the UE 1600 may include a transmitter 1604 including a UL transmission (TX) processing block 1601, a multiplexer 1602, and a TX RF block 1603, a receiver 1608 including a DL reception (RX) processing block 1605, a demultiplexer 1606, an RX RF block 1607, and a controller 1609. The controller 1609 may control the blocks of the receiver 1608 for receiving an SS block signal, and may control the blocks of the transmitter 1604 for transmitting a UL signal, by determining, for example, whether SS blocks are repeatedly transmitted as described above.

The UL transmission processing block 1601 in the transmitter 1604 of the UE may generate a signal to be transmitted, by performing processes such as channel coding and modulation. The signal generated by the UL transmission processing block 1601 may be multiplexed with other UL signals by the multiplexer 1602, be signal-processed by the transmission RF block 1603, and then be transmitted to a BS.

The receiver 1608 of the UE may demultiplex a signal received from the BS, and allocate the demultiplexed signals to DL reception processing blocks. The DL reception processing block 1605 may obtain control information or data transmitted from the BS, by performing processes such as demodulation and channel decoding on the DL signal of the BS. The receiver 1608 of the UE may support operation of the controller 1609 by providing outputs of the DL reception processing blocks to the controller 1609.

Figure 17:
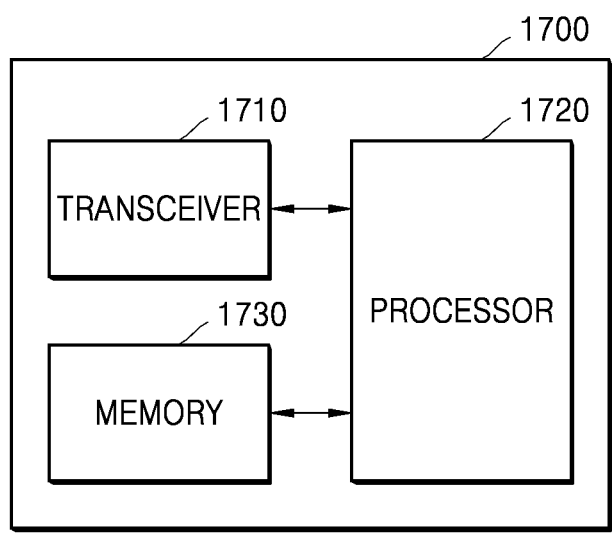
FIG. 17 is a block diagram of a BS, according to an embodiment.

FIG. 17 is a block diagram of a BS 1700 according to an embodiment.

Referring to FIG. 17, the BS 1700 may include a transceiver 1710, a processor 1720, and a memory 1730. The transceiver 1710, the processor 1720, and the memory 1730 may operate based on the synchronization methods described above in other embodiments of the disclosure. However, the components of the BS 1700 are not intended to be limited to the above-mentioned components. The BS 1700 may include a larger or smaller number of components as compared to the above-mentioned components. In some cases, the transceiver 1710, the processor 1720, and the memory 1730 may be configured as a single chip.

The transceiver 1710 may transmit or receive a signal to or from a UE. Herein, the signal may include a synchronization signal, control information, and data. To this end, the transceiver 1710 may include an RF transmitter configured to up-convert and amplify a frequency of a transmitted signal, and an RF receiver configured to low-noise-amplify a received signal and to down-convert a frequency of the received signal. However, the RF transmitter and the RF receiver are merely examples, and the components of the transceiver 1710 are not limited thereto.

The transceiver 1710 may receive a signal through a radio channel and output the signal to the processor 1720, and transmit a signal output from the processor 1720, through the radio channel.

The processor 1720 may control a series of procedures to operate the BS 1700 according to the afore-described embodiments of the disclosure. For example, the processor 1720 may perform at least one of the synchronization methods according to the afore-described embodiments of the disclosure.

The memory 1730 may store the control information or data included in the signal obtained by the BS 1700, and have an area for storing data required for or generated due to control operation of the processor 1720 to perform the above-described synchronization methods. The memory 1730 may be configured in various forms, e.g., ROM or/and RAM or/and a hard disk or/and CD-ROM or/and a DVD.

The reliability of synchronization signal detection of a UE may be increased by defining a synchronization method between a BS and the UE in a wireless communication system.

It should be understood that the afore-described embodiments of the disclosure should be considered in a descriptive sense only and not for purposes of limitation. Descriptions of aspects within each embodiment of the disclosure should be considered as available for other similar aspects in other embodiments of the disclosure. While one or more embodiments of the disclosure have been described with reference to the figures, it will be understood by those of ordinary skill in the art that various changes in form and details may be made therein without departing from the spirit and scope as defined by the appended claims and their equivalents.

What is claimed is:

1. A synchronization method of a user equipment (UE) in a wireless communication system, the method comprising:
   detecting a synchronization signal from a signal received from a base station (BS);
   detecting repeatedly receivable one or more synchronization signals after the synchronization signal is detected, based on each of blocks corresponding to a preset synchronization signal mapping pattern on time-frequency resources;

combining the one or more synchronization signals; and establishing synchronization with the BS based on a block corresponding to a highest strength of the combined one or more synchronization signals, among the blocks.

2. The method of claim 1, wherein the synchronization signal comprises at least one of a primary synchronization signal (PSS), a secondary synchronization signal (SSS), or a physical broadcast channel (PBCH) signal.

3. The method of claim 1, wherein the synchronization signal mapping pattern is set based on a subcarrier spacing determined per frequency band.

4. The method of claim 1, wherein detecting the repeatedly receivable one or more synchronization signals comprises determining blocks to which the detected synchronization signal is mappable, based on the synchronization signal mapping pattern set within a preset time window.

5. The method of claim 1, wherein the detecting of the synchronization signal comprises detecting the synchronization signal by scanning one or more radio frequency (RF) channels supported by the UE, based on a subcarrier spacing determined per frequency band.

6. The method of claim 1, further comprising determining a state of a channel through which the signal is received, wherein combining the one or more synchronization signals comprises combining the one or more synchronization signals when the state of the channel changes within a preset range.

7. A non-transitory computer-readable recording medium having recorded thereon a computer program for executing the method of claim 1.

8. The non-transitory computer-readable recording medium of claim 7, wherein the synchronization signal comprises at least one of a primary synchronization signal (PSS), a secondary synchronization signal (SSS), or a physical broadcast channel (PBCH) signal.

9. A synchronization method of a base station (BS) in a wireless communication system, the method comprising:

repeatedly transmitting synchronization signals at blocks corresponding to a preset synchronization signal mapping pattern on time-frequency resources; and allocating uplink resources based on a request of at least one user equipment (UE) when synchronization is established between the at least one UE and the BS based on the transmitted synchronization signals, wherein one or more synchronization signals detected by the at least one UE based on each of the blocks corresponding to the synchronization signal mapping pattern are combined and synchronization is established between the at least one UE and the BS based on a block corresponding to a highest strength of the combined one or more synchronization signals.

10. The method of claim 9, wherein each of the repeatedly transmitted synchronization signals comprises at least one of a primary synchronization signal (PSS), a secondary synchronization signal (SSS), or a physical broadcast channel (PBCH) signal.

11. The method of claim 9, wherein the synchronization signal mapping pattern is set based on a subcarrier spacing determined per frequency band.

12. A user equipment (UE) for establishing synchronization in a wireless communication system, the UE comprising:

a transceiver configured to receive a signal from a base station (BS);

at least one processor configured to detect a synchronization signal from the received signal, detect repeatedly receivable one or more synchronization signals after the synchronization signal is detected, based on each of blocks corresponding to a preset synchronization signal mapping pattern on time-frequency resources, combine the one or more synchronization signals, and establish synchronization with the BS based on a block corresponding to a highest strength of the combined one or more synchronization signals, among the blocks; and a memory configured to store the preset synchronization signal mapping pattern.

13. The UE of claim 12, wherein the synchronization signal comprises at least one of a primary synchronization signal (PSS), a secondary synchronization signal (SSS), or a physical broadcast channel (PBCH) signal.

14. The UE of claim 12, wherein the synchronization signal mapping pattern is set based on a subcarrier spacing determined per frequency band.

15. The UE of claim 12, wherein the at least one processor is further configured to determine blocks to which the detected synchronization signal is mappable, based on the synchronization signal mapping pattern set within a preset time window.

16. The UE of claim 12, wherein the at least one processor is further configured to detect the synchronization signal by scanning one or more radio frequency (RF) channels supported by the UE, based on a subcarrier spacing determined per frequency band.

17. The UE of claim 12, wherein the at least one processor is further configured to determine a state of a channel through which the signal is received, and combine the one or more synchronization signals when the state of the channel changes within a preset range.

18. A base station (BS) for establishing synchronization in a wireless communication system, the BS comprising:

a transceiver configured to repeatedly transmit synchronization signals at blocks corresponding to a preset synchronization signal mapping pattern on time-frequency resources;

at least one processor configured to allocate uplink resources based on a request of at least one user equipment (UE) when synchronization is established between the at least one UE and the BS based on the transmitted synchronization signals; and a memory configured to store the preset synchronization signal mapping pattern, wherein one or more synchronization signals detected by the at least one UE based on each of the blocks corresponding to the synchronization signal mapping pattern are combined and synchronization is established between the at least one UE and the BS based on a block corresponding to a highest strength of the combined one or more synchronization signals.

19. The BS of claim 18, wherein each of the repeatedly transmitted synchronization signals comprises at least one of a primary synchronization signal (PSS), a secondary synchronization signal (SSS), or a physical broadcast channel (PBCH) signal.

20. The BS of claim 18, wherein the synchronization signal mapping pattern is set based on a subcarrier spacing determined per frequency band.

* * * * *